United States Patent
Khateeb Razack

(10) Patent No.: US 9,570,762 B2
(45) Date of Patent: Feb. 14, 2017

(54) FUEL CELL COMPONENT INCLUDING A VAPOR PERMEABLE LAYER

(75) Inventor: Siddique Ali Khateeb Razack, East Windsor, CT (US)

(73) Assignee: Audi AG, Ingolstadt (DE)

( * ) Notice: Subject to any disclaimer, the term of this patent is extended or adjusted under 35 U.S.C. 154(b) by 957 days.

(21) Appl. No.: 13/588,066

(22) Filed: Aug. 17, 2012

(65) Prior Publication Data

US 2014/0051011 A1 Feb. 20, 2014

(51) Int. Cl.
*H01M 4/02* (2006.01)
*H01M 8/02* (2016.01)
*H01M 8/04* (2016.01)
*H01M 8/10* (2016.01)

(52) U.S. Cl.
CPC ......... *H01M 8/0228* (2013.01); *H01M 8/0245* (2013.01); *H01M 8/0267* (2013.01); *H01M 8/04134* (2013.01); *H01M 2008/1095* (2013.01); *Y02E 60/50* (2013.01); *Y10T 156/10* (2015.01)

(58) Field of Classification Search
CPC ............ H01M 2008/1095; H01M 8/0228; H01M 8/0245; H01M 8/0267; H01M 8/04134; Y02E 60/50; Y10T 156/10
See application file for complete search history.

(56) References Cited

U.S. PATENT DOCUMENTS

| | | | |
|---|---|---|---|
| 3,761,316 A | 9/1973 | Stedman | |
| 5,618,392 A * | 4/1997 | Furuya | C25B 9/10 204/242 |
| 6,042,955 A | 3/2000 | Okamoto | |
| 6,379,827 B1 | 4/2002 | Cipollini | |
| 7,413,826 B2 | 8/2008 | Ueda et al. | |
| 2005/0255373 A1 | 11/2005 | Kimura et al. | |
| 2006/0154117 A1 | 7/2006 | Toro | |
| 2007/0190401 A1 | 8/2007 | Ueda et al. | |
| 2008/0057373 A1 | 3/2008 | Breault et al. | |
| 2009/0214904 A1 * | 8/2009 | Zhou | H01M 8/04156 429/421 |
| 2010/0075199 A1 * | 3/2010 | Darling | 429/34 |
| 2010/0279208 A1 | 11/2010 | Niezelski et al. | |
| 2010/0307681 A1 * | 12/2010 | Breault | H01M 8/0213 156/326 |
| 2011/0229792 A1 * | 9/2011 | Dadheech et al. | 429/480 |

FOREIGN PATENT DOCUMENTS

| | | |
|---|---|---|
| CN | 101091270 A | 12/2007 |
| CN | 101199068 A | 6/2008 |
| CN | 101911354 A | 12/2010 |

(Continued)

OTHER PUBLICATIONS

Extended European Search Report for Application No. EP 13 17 9279 dated Dec. 3, 2013.

(Continued)

*Primary Examiner* — Patrick Ryan
*Assistant Examiner* — Ben Lewis
(74) *Attorney, Agent, or Firm* — Seed IP Law Group LLP

(57) ABSTRACT

An exemplary fuel cell component comprises a porous plate. A vapor permeable layer is provided on at least one portion of the porous plate. The vapor permeable layer is configured to permit vapor to pass through the layer while resisting liquid passage through the layer.

21 Claims, 2 Drawing Sheets

(56) References Cited

FOREIGN PATENT DOCUMENTS

| | | |
|---|---|---|
| JP | 2004-39416 A | 2/2004 |
| JP | 2006-510186 A | 3/2006 |
| JP | 2009-527093 A | 7/2009 |
| WO | 2009082406 A1 | 7/2009 |
| WO | 2010/131536 A1 | 11/2010 |

OTHER PUBLICATIONS

Chinese Supplementary Search Report, dated Dec. 15, 2015, for corresponding Chinese Application No. 201310357771.1, 2 pages.

\* cited by examiner

FUEL CELL COMPONENT INCLUDING A VAPOR PERMEABLE LAYER

BACKGROUND

Fuel cells are used as sources of electricity. Fuel cells facilitate an electrochemical reaction for generating electricity. Reactants such as hydrogen and oxygen are supplied to a membrane assembly where the electrochemical reaction occurs. The reactants are typically supplied to the membrane assembly using distribution plates that have channels for directing the reactants toward the membrane assembly.

Different types of distribution plates have been proposed or used for distributing the reactants. Some fuel cells include solid distribution plates. One drawback associated with solid distribution plates is that there is a tendency at high temperatures for the membrane to dry out, which results in a loss of performance. Porous distribution plates can allow moisture to move toward the membrane assembly, which tends to reduce the likelihood of membrane dry out at high temperatures. A drawback associated with porous distribution plates, however, is that liquid water may accumulate in the reactant distribution channels, which can interfere with a desired reactant supply to the membrane, especially at lower temperatures.

SUMMARY

An exemplary fuel cell component comprises a porous plate. A vapor permeable layer is provided on at least one portion of the porous plate. The vapor permeable layer is configured to permit vapor within the porous plate to pass through the layer while resisting liquid passage through the layer.

An exemplary fuel cell includes an electrode assembly. A porous reactant distribution plate is positioned adjacent the electrode assembly. A vapor permeable layer is between at least a portion of the porous reactant distribution plate and the electrode assembly. The vapor permeable layer is configured to permit vapor to pass between the porous reactant distribution plate and the electrode assembly. The vapor permeable layer is also configured to resist liquid passage between the porous reactant distribution plate and the electrode assembly.

An exemplary method of making a fuel cell includes providing an electrode assembly. A porous reactant distribution plate is positioned adjacent the electrode assembly. A vapor permeable layer is positioned between at least a portion of the porous reactant distribution plate and the electrode assembly.

The various features and advantages of a disclosed example embodiment will become apparent to those skilled in the art from the following detailed description. The drawings that accompany the detailed description can be briefly described as follows.

DETAILED DESCRIPTION

Figure 1:
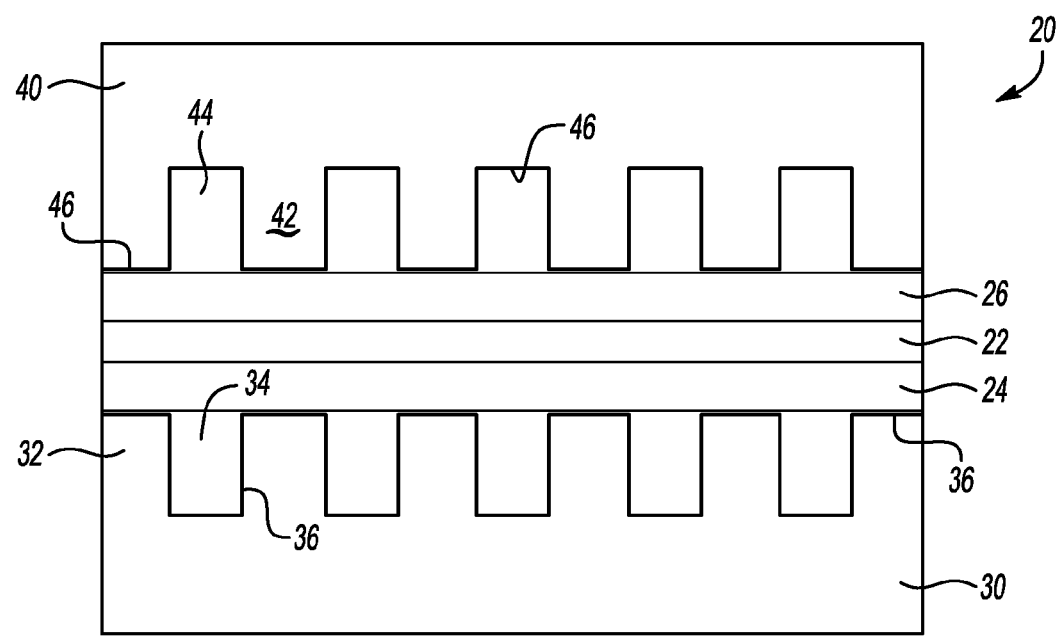
FIG. 1 schematically illustrates selected portions of a fuel cell designed according to an embodiment of this invention.

FIG. 1 schematically shows selected portions of a fuel cell 20. A membrane assembly 22 includes a membrane and two electrodes. The membrane assembly 22 includes known components for facilitating an electrochemical reaction between reactants, such as hydrogen and oxygen. Gas diffusion layers 24 and 26 are positioned on opposite sides of the membrane assembly 22.

A first reactant distribution plate 30 is situated next to the gas diffusion layer 24. The reactant distribution plate 30 comprises a porous body that allows liquids to penetrate the body of the porous plate 30. A plurality of ribs 32 and reactant flow channels 34 are arranged for providing a reactant to the membrane electrode assembly 22 through the gas diffusion layer 24.

The porous reactant distribution plate 30 includes a vapor permeable layer 36 on at least a portion of the porous plate 30. In this example, the vapor permeable layer 36 is situated on the ribs 32 and on the surfaces within each channel 34.

The vapor permeable layer 36 in some examples comprises a coating applied to a portion of the porous reactant distribution plate 30. Coating methods such as dip coating or spraying are used in some example embodiments for applying the layer 36. In other examples, the vapor permeable layer 36 comprises a film applied to the plate 30 or placed within the plate 30. Embodiments including a film layer 36 may have the film bonded to the plate 30.

Example materials used for the vapor permeable layer 36 include poly-dimethyl siloxane (PDMS), polytetrafluoroethylene (PTFE), polyvinyl chloride (PVC), polypropylene, and polyethylene. Given this description, those skilled in the art will realize which of those materials (or another polymer) will best meet the needs of their particular situation. PDMS has a favorable water vapor permeability, which makes it a useful polymer for the vapor permeable layer in some embodiments. PDMS also has a favorable thermal stability across a relatively wide temperature range.

In some examples, the material for the vapor permeable layer 36 includes at least one electrically conductive component, such as carbon. One example includes carbon black as a filler added to the material used for establishing the vapor permeable layer 36. Adding components such as carbon black also facilitates achieving a desired thermal conductivity within a fuel cell. Hydrophobic additives like PTFE or FEP minimize liquid water transport in some embodiments that include a carbon additive to compensate for a tendency of the carbon additive to wick liquid water.

Another porous reactant distribution plate 40 is positioned on an opposite side of the membrane electrode assembly 22 adjacent the gas diffusion layer 26. The porous reactant distribution plate 40 includes a plurality of ribs 42 and channels 44 for distributing a reactant to the membrane electrode assembly 22. The porous reactant distribution plate 40 includes a vapor permeable layer 46. In the illustrated example, the vapor permeable layer 46 is provided on the ribs 42 and on the surfaces within each channel 44.

Figure 2:
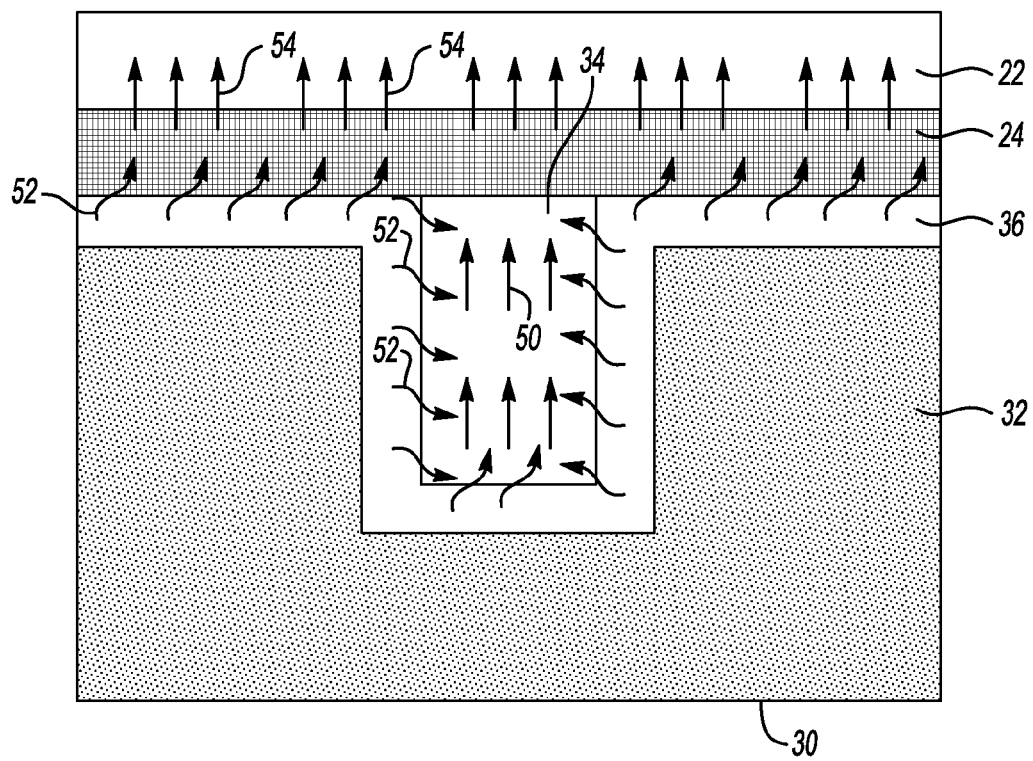
FIG. 2 schematically illustrates selected portions of the example embodiment of FIG. 1.

FIG. 2 illustrates one of the channels 34 and two of the ribs 32 from the example porous reactant distribution plate 30. A reactant gas is schematically shown at 50 within the channel 34. The arrows schematically represent movement of the reactant gas toward the membrane electrode assembly 22. The vapor permeable layer 36 prevents liquid water (or another coolant) that is within the pores of the body of the plate 30 from passing through the layer 36. In other words, the layer 36 prevents liquid from passing between the porous reactant distribution plate 30 and the membrane electrode assembly 22.

As schematically shown at 52, the vapor permeable layer 36 permits vapor, such as water vapor, to pass through the layer 36. Vapor is schematically shown at 52 in FIG. 2 to represent vapor passage from within the porous plate 30 toward the membrane electrode assembly 22. The vapor schematically shown at 52 serves to humidify the reactant gas 50. Humidified gas is schematically shown at 54 in FIG. 2. The humidified gas schematically shown at 54 passes through the gas diffusion layer 24 as it is supplied to the membrane electrode assembly 22. The humidified gas 54 facilitates avoiding membrane dry out during high temperature conditions.

Figure 3:
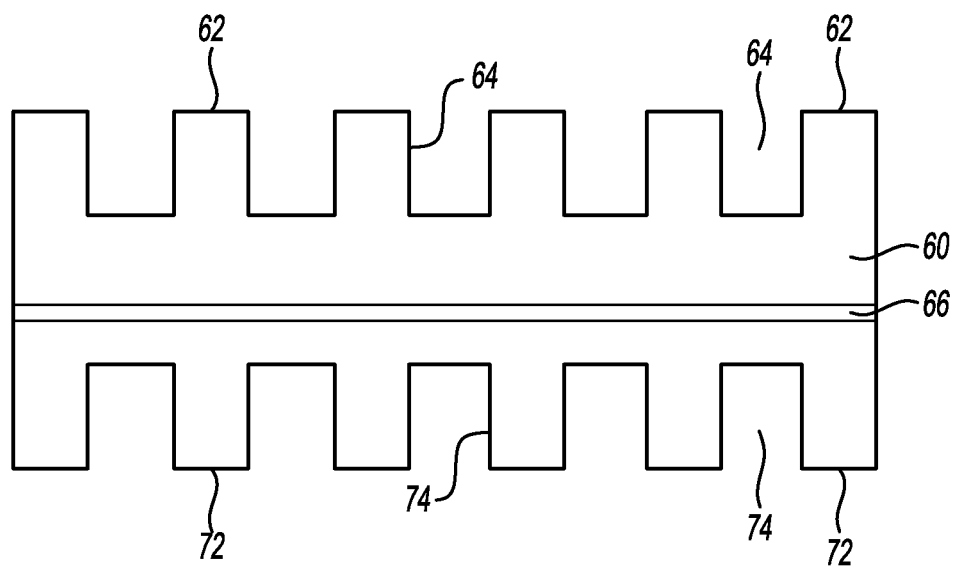
FIG. 3 schematically illustrates another example embodiment.

FIG. 3 illustrates another example embodiment of a porous plate 60. In this example, a plurality of ribs 62 and channels 64 are provided for facilitating reactant flow and distribution within a fuel cell. A vapor permeable layer 66 is embedded within the body of the plate 60. This is different than the example of FIGS. 1 and 2 in which the vapor permeable layer 36 is applied to an outer surface on a porous plate. The position of the vapor permeable layer 66 within the plate 60 may vary depending on the needs of a particular situation.

In the example of FIG. 3, the vapor permeable layer 66 is situated so that liquid coolant is not allowed to completely pass through the plate 60 where it would enter the channels 64. For example, ribs 72 and channels 74 are provided for facilitating coolant flow within a fuel cell. Liquid coolant within the channels 74 is not allowed to freely pass through the porous plate 60 because of the vapor permeable layer 66, which resists liquid passage toward the channels 64. At the same time, however, vapor associated with the liquid coolant is allowed to pass through the layer 66 so that reactant within the channel 64 may be humidified.

Given this description, those skilled in the art will realize various other arrangements for associating a vapor permeable layer with a porous plate for controlling vapor and liquid passage at various locations within a fuel cell. Given this description, those skilled in the art will also be able to determine whether realizing the vapor permeable layer by applying a coating or including a film will best meet their particular needs.

The illustrated example arrangements provide the ability to realize the positive aspects of a porous reactant distribution plate because they facilitate providing humidifying reactant gas to the membrane electrode assembly 22. The illustrated arrangements also realize positive aspects of a solid reactant distribution plate because they prevent water build up within the reactant distribution channels 34. At the same time, the illustrated arrangements avoid membrane dry out otherwise associated with solid reactant distribution plates. In other words, the illustrated arrangements allow for achieving the positive effects of using a porous reactant distribution plate and the positive effects of using a solid reactant distribution plate without experiencing the drawbacks associated with either of those types of reactant distribution plate.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell component, comprising:
  a porous plate having a plurality of ribs, each rib having opposing side surfaces and an end surface extending between the opposing side surfaces, the side surfaces of adjacent ribs defining channels interposed between adjacent ribs; and
  a vapor permeable layer provided on at least one of the opposing side surfaces and the end surface of at least one of the plurality of ribs, the side surfaces located within the channels, the vapor permeable layer being configured to permit vapor to pass through the vapor permeable layer while resisting liquid from passing through the vapor permeable layer, wherein the vapor permeable layer includes a first surface and an opposing second surface, a respective portion of the first surface interfacing with the end surface of each rib and at least portion of the opposing second surface interfacing with a gas diffusion layer of an electrode assembly.

2. The fuel cell component of claim 1, wherein the porous plate is a reactant distribution plate including the plurality of channels configured for facilitating gas reactant flow such that the gas reactant may be used in an electrochemical reaction for generating electricity in a fuel cell.

3. The fuel cell component of claim 2, wherein
  the vapor permeable layer is on a side of the porous plate that includes the channels.

4. The fuel cell component of claim 1, wherein
  the vapor permeable layer is embedded inside the porous plate.

5. The fuel cell component of claim 1, wherein the vapor permeable layer comprises at least one of a coating or a film.

6. The fuel cell component of claim 1, wherein the vapor permeable layer comprises poly-dimethyl siloxane.

7. The fuel cell component of claim 6, wherein the vapor permeable layer comprises an electrically conductive additive.

8. The fuel cell component of claim 7, wherein the electrically conductive additive comprises carbon and comprising a hydrophobic additive to minimize liquid water transport.

9. The fuel cell component of claim 1, wherein the vapor permeable layer comprises one of polytetrafluoroethylene, polyvinyl chloride, polypropylene or polyethylene.

10. The fuel cell component of claim 1, wherein the vapor permeable layer comprises a composite material including a polymer and carbon.

11. The fuel cell of claim 10, wherein the vapor permeable layer comprises at least one of a coating or a film.

12. A fuel cell, comprising:
  an electrode assembly;
  a porous reactant distribution plate adjacent the electrode assembly, the porous reactant distribution plate having a plurality of ribs, each rib having opposing side surfaces and an end surface extending between the opposing side surfaces, the side surfaces of adjacent ribs defining channels interposed between adjacent ribs; and
  a vapor permeable layer between at least a portion of the porous reactant distribution plate and the electrode assembly, the vapor permeable layer provided on at least one of the opposing side surfaces and the end surface of at least one of the plurality of ribs, the side surfaces located within the channels, the vapor permeable layer configured to permit vapor to pass between the porous reactant distribution plate and the electrode assembly while preventing liquid from passing between the porous reactant distribution plate and the electrode assembly, wherein the vapor permeable layer includes a first surface and an opposing second surface, a respective portion of the first surface interfacing with the end surface of each rib and at least a portion of the opposing second surface interfacing with a gas diffusion layer of the electrode assembly.

13. The fuel cell of claim 12, wherein the vapor permeable layer is on a side of the porous reactant distribution plate that faces the electrode assembly.

14. The fuel cell of claim 12, wherein the vapor permeable layer is on the ribs and the channels.

15. The fuel cell of claim 12, wherein the vapor permeable layer is embedded inside the porous plate or located at interface separating gas flow field and coolant flow field.

16. The fuel cell of claim 12, wherein the vapor permeable layer comprises poly-dimethyl siloxane.

17. The fuel cell of claim 16, wherein the vapor permeable layer comprises an electrically conductive additive.

18. The fuel cell of claim 17, wherein the electrically conductive additive comprises carbon and a hydrophobic additive to minimize liquid water transport.

19. The fuel cell of claim 12, wherein the vapor permeable layer comprises one of polytetrafluoroethylene, polyvinyl chloride, polypropylene or polyethylene.

20. A method of making a fuel cell, comprising:
providing an electrode assembly;
positioning a porous reactant distribution plate adjacent the electrode assembly, the porous reactant distribution plate having a plurality of ribs, each rib having opposing side surfaces and an end surface extending between the opposing side surfaces, the side surfaces of adjacent ribs defining channels interposed between adjacent ribs; and
associating a vapor permeable layer with at least one of the opposing side surfaces and the end surface of at least one of the plurality of ribs of the porous reactant distribution plate, the side surfaces located within the channels, the vapor permeable layer associated with the end surface located in a region between the end surface of the rib and the electrode assembly which permits vapor to pass between the porous reactant distribution plate and the electrode assembly while resisting liquid passage between the porous reactant distribution plate and the electrode assembly, wherein the vapor permeable layer includes a first surface and an opposing second surface, a respective portion of the first surface interfacing with the end surface of each rib and at least a portion of the opposing second surface interfacing with a gas diffusion layer of the electrode assembly.

21. The method of claim 20, comprising establishing the vapor permeable layer by at least one of
bonding a vapor permeable film to at least the side surface of the porous reactant distribution plate or
coating at least the side surface of the porous reactant distribution plate with a vapor permeable material.

* * * * *